J. D. & J. Royse,
Washing Machine.
No. 101,768. Patented Apr. 12, 1870.
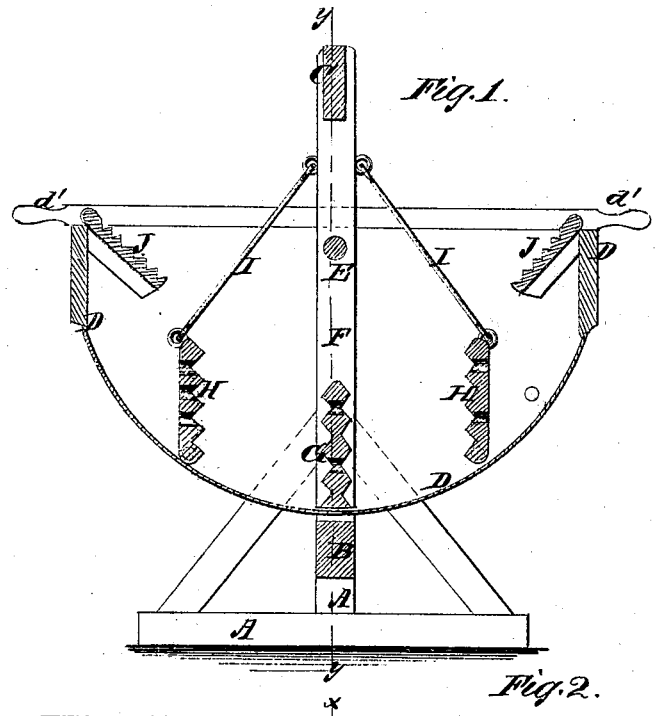
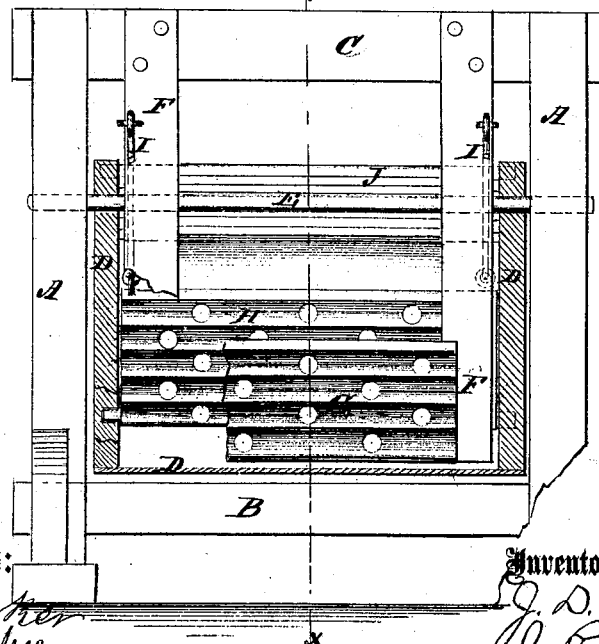

United States Patent Office.

JAMES D. ROYSE AND JOHN ROYSE, OF CANE VALLEY, KENTUCKY.

Letters Patent No. 101,768, dated April 12, 1870.

IMPROVED WASHING-MACHINE.

The Schedule referred to in these Letters Patent and making part of the same.

*To all whom it may concern:*

Be it known that we, JAMES D. ROYSE and JOHN ROYSE, of Cane Valley, in the county of Adair and State of Kentucky, have invented a new and useful Improvement in Washing-Machine; and we do hereby declare that the following is a full, clear, and exact description thereof, which will enable others skilled in the art to make and use the same, reference being had to the accompanying drawings forming part of this specification, in which—

Figure 1 is a vertical longitudinal section of our improved machine, taken through the line x x, fig. 2.

Figure 2 is a detail cross-section of the same, taken through the line y y, fig. 1, and part being broken away to show the construction.

Our invention has for its object to furnish an improved washing-machine, simple in construction, strong and durable, which will not rub the clothes, and which will at the same time wash them quickly and thoroughly; and It consists in the construction and combination of various parts of the machine, as hereinafter more fully described.

A are the side uprights or frames, which are made with broad bases or sills, to give a firm and stable support to the machine.

The lower parts of the uprights or frames A are connected and held in their proper relative positions by a cross-bar, B.

The upper ends of the uprights or frames A are connected and held in their proper relative positions by a cross-beam, C, as shown in figs. 1 and 2.

D is the box or tub, which is made semi-cylindrical in its general form, and which is suspended from and pivoted to the uprights or frames A by a rod, E.

The top side bars d' of the box or tub D are extended, as shown in fig. 1, to serve as handles for operating the machine.

To the cross-beam C are attached the upper ends of two bars, F, which extend down within the box or tub D, along the straight sides of said box or tub, as shown in fig. 2, and to their lower ends are attached the ends of the board G, which is deeply grooved or corrugated upon both sides, and perforated with numerous holes to allow the water or suds to pass through freely.

H are two boards, placed one upon each side of the board G, and which are deeply corrugated upon their inner sides, and are perforated with numerous holes to allow the water to pass through freely.

The grooved and perforated boards H are pivoted at the lower part of their end edges to the vertical sides of the box or tub D, and their upper edges are connected with the uprights F by the rods I, the lower ends of which are pivoted to the upper edges of the boards H, near their ends, and the upper ends of which are pivoted to the said stationary bars F.

It should be observed that the rod E passes through the uprights F, and thus serves to brace and strengthen the said bars.

J are two rubber-boards, hinged at their upper edges to the edges of the ends of the box or tub D, and the ends of which rest, when turned down into working position, upon inclined cleats attached to the vertical sides of the box or tub D, as shown in fig. 1.

The rubbing-boards J are designed for occasional use, when required, for rubbing neck-bands, wristbands, or other very much soiled parts of the clothes.

In using the machine, the clothes to be washed are placed in the tub or box D, upon one or both sides of the stationary board G, and the tub D is oscillated by means of the handles d' compressing the clothes between the pivoted board or boards H and the stationary board G, squeezing out the water, which carries the dirt with it.

As the tub swings in the other direction the clothes are again immersed and saturated with water, which is again squeezed out at the next oscillation of the box or tub.

In this way the clothes are quickly and thoroughly washed, and without injury to them, however delicate may be their fabric.

Having thus described our invention,

We claim as new and desire to secure by Letters Patent—

The deeply grooved and perforated boards H, pivoted at their lower edges to the straight sides of the box D, and connected at their upper edges to the stationary bars F by the pivoted connecting-rods I, in combination with the grooved and perforated stationary board G, uprights F, and oscillating box or tub D, substantially as herein shown and described, and for the purpose set forth.

JAMES D. ROYSE.
JOHN ROYSE.

Witnesses:
SAML. H. MERRILL,
JORDAN PAGE.